United States Patent [19]

Wibrow

[11] 4,379,358

[45] Apr. 12, 1983

[54] CORD ADJUSTERS

[75] Inventor: Güter Wibrow, Norderstedt, Fed. Rep. of Germany

[73] Assignee: ITW-ATECO GmbH, Norderstedt, Fed. Rep. of Germany

[21] Appl. No.: 288,701

[22] Filed: Jul. 30, 1981

[51] Int. Cl.³ .............................................. F16G 11/00
[52] U.S. Cl. ................................. 24/136 R; 24/115 M
[58] Field of Search .............. 24/136 R, 136 K, 136 L, 24/115 M, 115 H

[56] References Cited

U.S. PATENT DOCUMENTS

| 769,878 | 9/1904 | Sturgis | 24/136 R |
| 3,965,544 | 6/1976 | Boden | 24/136 R |

Primary Examiner—Jay N. Eskovitz
Attorney, Agent, or Firm—Trexler, Bushnell & Wolters, Ltd.

[57] ABSTRACT

A cord adjuster comprising a body 31 having a through passage 32 which is divided longitudinally for the accommodation of cord sections capable of being passed therethrough in side-by-side spaced arrangement, and an arresting member 10 supported on the body for displacement between two end positions, said arresting member being provided with clamping areas 21, 22 disposed in the through passage and cooperating with respective associated clamping areas 45, 46 of the body, in order to clamp the cord sections between them in tight clamping engagement in one end position of the arresting member. The passage 32 is at least in part an open-topped channel, a stationary clamping projection 44 is arranged on the bottom of the channel, and the arresting member 10 is a lid member slidingly displaceable on the upper surface of the body and closing the channel, said lid member being provided on the underside thereof with guiding projections 24, 25 for locating and slidingly guiding, said projections engaging beneath corresponding guiding portions 41, 42 of the body, and the clamping areas 21, 22 being formed integrally with the lid member 10 and extending on both sides of the clamping projection 44 while being spaced therefrom.

10 Claims, 3 Drawing Figures

CORD ADJUSTERS

The present invention relates to cord adjusters comprising a body having a through passage which is divided longitudinally for the accommodation of cord sections capable of being passed therethrough in side-by-side spaced arrangement and an arresting member supported on the body for displacement between two end positions, said arresting member being provided with clamping areas disposed in the through passage and cooperating with respective associated clamping areas of the body in order to clamp the cord sections between them in clamping engagement in one end position of the arresting member.

Such a cord adjuster is known, and is currently used, for example, for rucksacks or the like. The body, formed of plastics material, has a through passage with a disc arranged therein, said disc being provided with a peripheral toothed edge and having an axial pin which is guided in a longitudinal slot in the body so that the disc is capable of displacement between two end positions. The side walls of the through passage converge towards one end, so that in one end position of the disc the space between the periphery of the disc and the channel walls is a minimum.

With this known cord adjuster it is a disadvantage that the arresting member which is formed as a clamping disc is floatingly supported in the body. Because of this the danger exists that owing to vibrations, shocks or the like the arresting member may move in a direction towards release position and will thus no longer completely fulfil its function.

Another cord adjuster is known in which a pin is supported in a sleeve, and the sleeve and the pin are provided each with a through bore adapted to be brought into register, through which the cord sections disposed in side-by-side arrangement are passed. A spring arranged between the bottom of the sleeve and the end of the pin disposed in the sleeve biases the pin outwards and thus clamps the cord sections between the openings.

With this known cord adjuster it is a disadvantage that it consists of three parts and thus is relatively costly from a material and production standpoint. In addition, its design is bound to be unfavourable where space is concerned, the more so as the main extension thereof is transversely of the cord sections passed therethrough. Finally, because of the direct side-by-side arrangement of the cord sections the retention force is not particularly high.

The present invention is based upon the problem of providing a cord adjuster which avoids the above-mentioned drawbacks and allows an effective fixation of the cord sections while, in particular, being of small bulk.

This problem is solved in connection with a cord adjuster of the type mentioned at the beginning in that the passage is at least in part an open-topped channel, a stationary clamping projection is arranged on the bottom of the channel, and the arresting member is a lid member slidingly displaceable on the upper surface of the body and closing the channel, said lid member being provided on the underside thereof with at least one guiding projection for locating and slidingly guiding, said projection engaging beneath a corresponding guiding portion of the body, and the clamping areas being formed integrally with the lid member and extending on both sides of the clamping projection while being spaced therefrom.

Just as is the case with the first-mentioned known cord adjuster, cord adjusters embodying the invention likewise consist of only two parts, preferably of plastics material. However, owing to the abutment of the lid element on the body and the engagement of a guiding projection behind a guiding portion of the body, a spatially located relationship is established between the said components, so that they are designed to be capable of being displaced relative to each other along one line only. Given friction between the cooperating surfaces of the body and the lid member, disarrangement between the said elements due to vibration or slight contacting is safely prevented, unless adjustment is brought about at will through displacement by hand.

As the clamping projection and the clamping areas on the lid member, from a spatial point of view, are always disposed in the same position with respect to each other, it is possible with the invention to design the cooperating areas in such a manner that effective gripping of the two cord sections passed through side-by-side is guaranteed.

The body and the lid member are preferably designed in such a manner that in the normal position, i.e. the clamping position, they form together an enclosed casing, which is obtained, in particular, when in the said position the lid member covers the facing side of the body and is flush therewith.

In order to guarantee an effective gripping of the cord sections in the cord adjuster, provision is made in a preferred embodiment of the invention for the clamping projection to be of wedge-shaped configuration and its clamping areas to comprise clamping edges, with the clamping areas of the lid member diverging in the direction opposite to the direction of divergence of the lateral surfaces of the clamping projection. The lateral surfaces of the clamping projection are forming relatively sharp edges with the broader end face of the wedge-shaped clamping projection, and these edges embed by digging into the material of the cord, in order to bring about an effective grip.

The power of retention is still more enhanced if, in accordance with a further preferred feature, the clamping areas of the lid member are provided with corrugations.

The clamping areas of the lid member must necessarily project into the through passage. In this connection provision is made in accordance with another preferred feature, for the clamping areas of the lid member to be formed integrally on downwardly extending ribs, and the outer surfaces of the ribs are parallel and are guided by parallel side walls of the passage. This guidance ensures that displacement of the body and the lid member with respect to each other is along one line only.

The retention between body and lid member, as already mentioned, is obtained through the engagement of a guiding projection beneath a guiding portion. In this connection provision is made, in accordance with another preferred feature, for there to be two guiding projections, projecting beyond the outer surfaces of the ribs, said projections engaging within respective elongated recesses in the side walls of the passage, one end of each recess being open towards one end of the body, the other end of said recess defining an end position of the lid member, in which the distance between the clamping areas of the clamping projection on the one hand and of the lid member on the other hand is a minimum.

In order to obtain a still better retention between the body and the lid member, provision is made, in accordance with another preferred feature, for the body to be provided with guiding portions at the end thereof opposite the recesses, said guiding portions being formed integrally with the side walls of the channel and extending towards each other, and engaging in recesses in the ribs of the lid member.

Although the lid member may hold onto the body by itself through friction, it is advantageous to provide a limitation of displacement in the direction towards the position of release. For this purpose provision is made, in accordance with another preferred feature, for the lid member and the body to be each provided with a detent on their sides facing each other, said detents limiting the displacement of the parts with respect to each other in the direction towards the position of release.

In accordance with another preferred feature, it is provided in this connection that the detent on the lid member is formed integrally with the lid inner surface in an axially-extending channel-shaped depression, while the detent on the body is formed by a shoulder on the upper surface of the clamping projection. When mounting the two components of a cord adjuster with this feature, the cooperating detents must first be caused to override. They are therefore suitably provided with upward sloping ramp areas which must override first before corresponding shoulders may get into snapping engagement. When disassembling both components of the cord adjuster, the lid member only need be lifted by a small amount in order to get the detents out of engagement, so that the lid member may be pushed completely off the body.

In the following, one example of a cord adjuster embodying the invention will be described with reference to the accompanying drawings, in which.

Prior to dealing individually with the representations of the drawings in more detail, it is to be noted that each feature is of inventively essential importance by itself or in connection with features of the claims.

Further, to begin with it has also to be mentioned that the components shown in the Figures are considerably enlarged.

Figure 1:
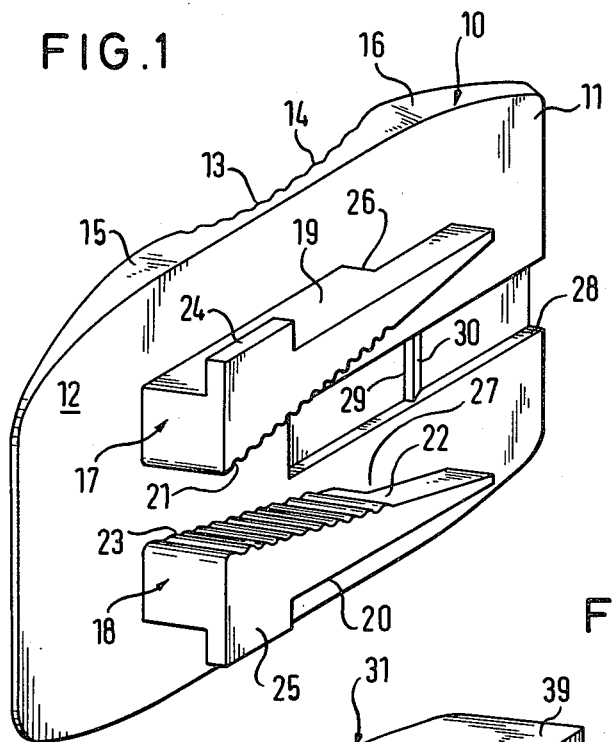
FIG. 1 shows in a perspective view the underside of a lid member of the cord adjuster.

The lid member shown in FIG. 1 is generally referenced 10 and comprises a relatively flat lid portion 11 of approximately rectangular outline, with a smooth undersurface 12, and a depression 13 on the upper surface thereof provided with transversely extending corrugations 14. The central depression is joined by curved portions 15 and 16, respectively, on either side. Two ribs 17, 18 are formed integrally with the under surface 12 of the lid portion 11. The ribs 17, 18 have parallel outer surfaces 19 and 20, respectively, and diverging inner surfaces 21, 22 facing each other. These surfaces 21, 22 form clamping areas and are provided with transversely extending corrugations 23 in the region of closer spacing.

The ribs 17, 18 are thus approximately wedge-shaped. They have rectangular extensions 24, 25 respectively, formed integrally with the broader end on the outer surface thereof. At the opposite end, recesses 26, 27 are provided in the ribs. These recesses are defined at one side by the under surface 12 of the lid portion 11.

A channel-shaped depression 28 is formed integrally in the lid portion 11, extending in the direction of the longitudinal axis thereof, said depression being open at the end of the lid member 10 disposed towards the diverging direction of the clamping areas 21, 22. At about the mid-length of the depression 28 there is a projection 29, the height of which reaches to the under surface 12 of the lid portion 11. The projection 29 possesses an obliquely upward sloping ramp area 30.

Figure 2:
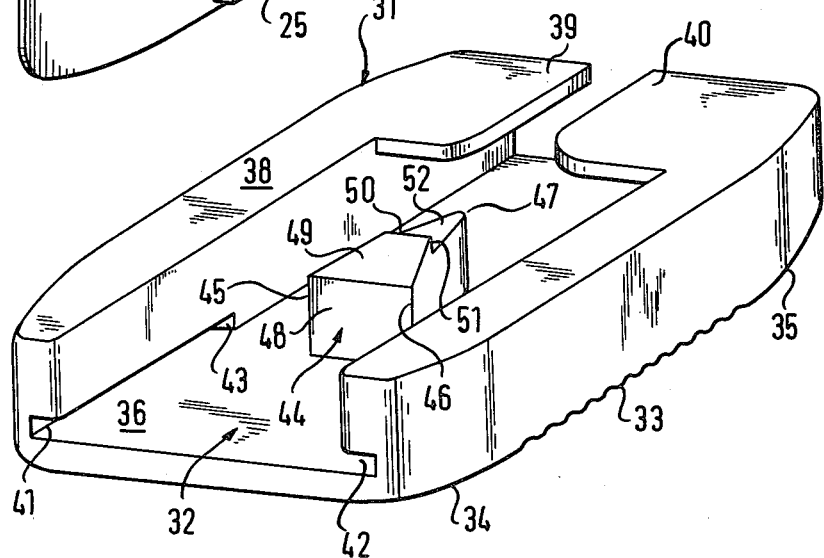
FIG. 2 shows in a perspective view the inner surface of the body of the cord adjuster.

The body shown in FIG. 2 is generally referenced 31 and has an approximately U-shaped cross section, due to a through passage 32. On the lower surface thereof, said body is provided with a corrugated portion 33. Two slightly downwardly curved portions 34, 35 extend on either side of the corrugated portion 33.

The through passage 32 comprises a bottom surface 36 and side walls 37 extending vertically thereto which are parallel with respect to each other. The upper surface 38 of the body 31 as shown in FIG. 2 is flat and is approximately parallel to the bottom surface 36 of the passage 32. Extensions 39, 40 are formed integrally with the body 31 at one end thereof, said extensions extending towards each other and having the upper surface thereof disposed in a common plane with the upper surface 38 of the body 31.

At the end opposite the extensions 39, 40, recesses 41, 42 are formed integrally with the side walls 37 of the passage 32. The recesses 41, 42 are open towards the associated end of the body 31, and are each limited by an abutment 43 at the opposite end.

Approximately in the centre of the body 31, a clamping projection 44 is formed integrally with the bottom surface 36 and extends upwards within the passage 32. The clamping projection 44 has approximately the shape of a symmetrical wedge with side faces terminating at one side in a somewhat rounded apex 47, while at the opposite end they are defined by a transverse area 48 extending approximately perpendicular to the side walls 37 and forming relatively sharp clamping edges 45, 46. At the wider end the clamping projection 44 is provided with a ramp area 49 at the upper surface thereof, sloping upwards towards the apex 47. This ramp drops at 50 and forms a detent shoulder 51. The area 52 beyond the shoulder 51 is disposed approximately in the plane of the upper surface 38.

Figure 3:
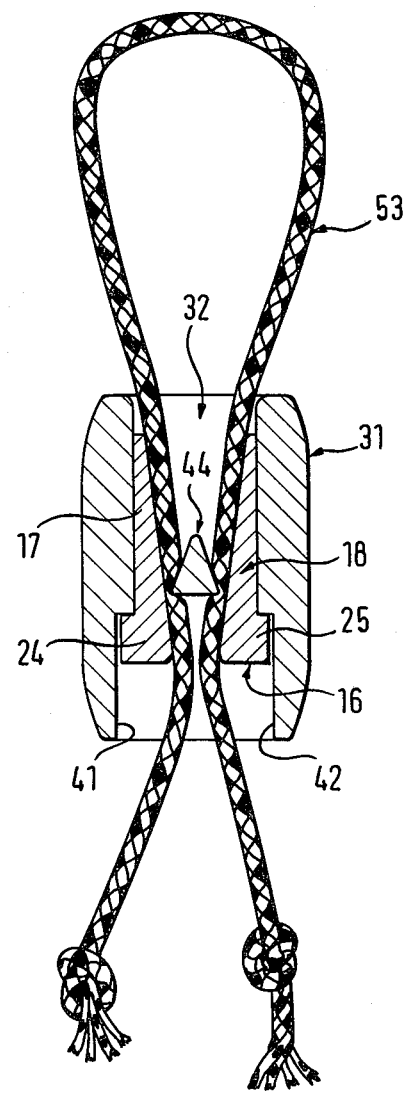
FIG. 3 shows a sectional view of the cord adjuster, with a cord placed in position therein.

FIGS. 1 and 2 show the faces of the parts which are brought together when the adjuster is assembled, as can be seen from FIG. 3.

That means that the ribs 17, 18 of the lid member 10 are pushed into the through passage 32 with the side walls 19, 20 sliding along the channel side walls 32, while the undersides of the ribs 17, 18, which are likewise flat and extend in parallel with the lid surface 12, are sliding on the flat bottom surface 36. Furthermore, the lid lower surface 12 slides on the upper surface 38 of the body 31. With continued displacement of the lid member 10, the extensions 39, 40 come into engagement within the recesses 26, 27 of the ribs 17, 18, and the lateral extensions 24, 25 of the ribs 17, 18 come into engagement in the recesses 41, 42 of the body. Finally, the oblique surface 30 of the projection 29 of the lid member 10 rides up on the ramp area 49 of the clamping projection 44 until the projection 29 comes into snapping engagement in reach of the shoulder 51 of the clamping projection 44. With this, a connection has been created between the lid member 10 and the body 31 which can no longer be released without disengaging the detent shoulder 51 and the detent projection 29 from each other. The projection 29 and the shoulder 51 in addition constitute a limitation of displacement in the release position, which is not shown here and in which the cord sections of a cord 53 (FIG. 3) can respectively be passed between the clamping projection 44 and the associated clamping area, and adjustment of the cord is possible. In the relative position of body 31 and lid member 10 as shown in FIG. 3, the cord sections are tightly clamped so that tension forces applied to the cord 53 will not bring about an adjustment.

From the Figures it may be recognised that the cord adjuster shown therein constitutes a conveniently actuable, flat member, which is of slight bulk and which guarantees a secure gripping of the cord sections.

I claim:

1. A cord adjuster comprising a body having a through passage which is divided longitudinally for the accommodation of cord sections capable of being passed therethrough in side-by-side spaced arrangement and an arresting member supported on the body for displacement between two end positions, said arresting member being provided with clamping areas disposed in the through passage and cooperating with respective associated clamping areas of the body in order to clamp the cord sections between them in tight clamping engagement in one end position of the arresting member, characterised in that the passage is at least in part an open-topped channel, a stationary clamping projection is arranged on the bottom of the channel, and the arresting member is a lid member slidingly displaceable on the upper surface of the body and closing the channel, said lid member being provided on the underside thereof with at least one guiding projection for locating and slidingly guiding said projection engaging beneath a corresponding guiding portion of the body, and the clamping area being formed integrally with the lid member and extending on both sides of the clamping projection while being spaced therefrom, said lid and said body having opposed finger engaging sections thereon for engagement by a thumb and one other finger to effect relative sliding movement of said body and said lid between clamping and non-clamping positions.

2. A cord adjuster according to claim 1, characterised in that the clamping projection is wedge-shaped and its clamping areas comprise clamping edges, and in that the clamping areas of the lid member are divergent in the direction opposite to the direction of divergence of the lateral surfaces of the clamping projection.

3. A cord adjuster according to claim 1 or claim 2, characterised in that the clamping areas of the lid member are provided with corrugations.

4. A cord adjuster according to any of claim 1 or claim 2, characterised in that the clamping areas of the lid member are formed integrally on downwardly extending ribs, and the outer surfaces of the ribs are parallel and are guided by parallel side walls of the passage.

5. A cord adjuster according to claim 4, characterised in that there are two guiding projections, projecting beyond the outer surfaces of the ribs, said projections engaging within respective elgongated recesses in the side walls of the passage, one end of each recess being open towards one end of the body, the other end of said recess defining an end position of the lid member in which the distance between the clamping areas of the clamping projection on the one hand and of the lid member on the other hand is a minimum.

6. A cord adjuster according to claim 5, characterised in that the body is provided with guiding portions at the end thereof opposite the recesses, which portions are formed integrally with the side walls of the channel and extending towards each other, and engaging in recesses in the ribs of the lid member.

7. A cord adjuster according to claim 1, characterised in that the lid member and the body are each provided with a detent on their sides facing each other, said detents limiting the displacement of the parts with respect to each other in the direction towards the position of release.

8. A cord adjuster according to claim 7, characterised in that the detent on the lid member is formed integrally with the lid inner surface in an axially-extending channel-shaped depression, while the detent on the body is formed by a shoulder on the upper surface of the clamping projection.

9. A cord adjuster according to claim 8, characterised in that the detent on the body is provided with an upward sloping ramp area in front of the shoulder, which cooperates with a facing oblique surface of the detent on the lid member.

10. A cord adjuster according to claim 1, characterised in that the body and the lid member finger engaging section comprises corrugated sections on opposing outer surfaces, the corrugated section of the lid member being arranged in curved depression.

* * * * *